(12) United States Patent
Choe

(10) Patent No.: US 10,536,174 B1
(45) Date of Patent: Jan. 14, 2020

(54) INTERFACE FOR EFFICIENT USAGE OF COMMUNICATION CIRCUITRY

(71) Applicant: Intel Corporation, Santa Clara, CA (US)

(72) Inventor: Kok Heng Choe, Sg Ara (MY)

(73) Assignee: Intel Corporation, Santa Clara, CA (US)

( * ) Notice: Subject to any disclaimer, the term of this patent is extended or adjusted under 35 U.S.C. 154(b) by 50 days.

(21) Appl. No.: 15/439,017

(22) Filed: Feb. 22, 2017

(51) Int. Cl.
| | |
|---|---|
| *H04B 1/06* | (2006.01) |
| *H04B 1/18* | (2006.01) |
| *H04B 1/00* | (2006.01) |
| *G06F 13/36* | (2006.01) |
| *G06F 13/40* | (2006.01) |
| *G06F 13/42* | (2006.01) |

(52) U.S. Cl.
CPC ............ *H04B 1/005* (2013.01); *G06F 13/36* (2013.01); *G06F 13/4027* (2013.01); *G06F 13/4068* (2013.01); *G06F 13/4282* (2013.01); *G06F 2213/0026* (2013.01)

(58) Field of Classification Search
CPC . H04B 1/005; H04B 1/06; H04B 3/36; H04B 7/185; H04B 1/18; H04B 1/00; G06F 13/36; G06F 13/4027; G06F 13/4068; G06F 13/4282; G06F 2213/0026; G01S 7/021
See application file for complete search history.

(56) References Cited

U.S. PATENT DOCUMENTS

| | | | | |
|---|---|---|---|---|
| 6,032,020 A | * | 2/2000 | Cook | H04B 7/2606 455/16 |
| 6,408,164 B1 | * | 6/2002 | Lazaris-Brunner | H04B 7/18515 455/12.1 |
| 7,219,181 B2 | * | 5/2007 | Carty | G06F 13/4221 710/301 |
| 7,702,827 B2 | * | 4/2010 | Biran | G06F 13/4282 709/236 |
| 7,752,372 B2 | * | 7/2010 | Mussatt | G06F 13/405 710/301 |
| 8,630,601 B2 | * | 1/2014 | Chandler | G01S 7/021 375/214 |
| 8,786,308 B1 | * | 7/2014 | Loh | H03K 19/177 326/10 |
| 9,030,253 B1 | * | 5/2015 | Ngai | H01L 25/00 327/564 |
| 9,106,229 B1 | * | 8/2015 | Hutton | H03K 19/173 |
| 9,148,178 B2 | * | 9/2015 | Wu | H04B 1/0057 |
| 9,258,018 B2 | * | 2/2016 | Uehara | H04B 1/0071 |
| 9,467,120 B1 | * | 10/2016 | Song | G06F 1/3237 |
| 9,515,690 B1 | * | 12/2016 | Chapman | H03F 1/0205 |

* cited by examiner

*Primary Examiner* — Pablo N Tran
(74) *Attorney, Agent, or Firm* — Fletcher Yoder, P.C.

(57) ABSTRACT

Communication circuitry having efficient utilization of transceiver and channel resources is described. The communication circuitry may dynamically reallocate transceiver resources assigned to protocol circuitry, such that it becomes available for other circuitry or for the interface of the transceiver circuitry. Multiplexers of the transceiver circuitry may be used in the reallocation of resources.

19 Claims, 3 Drawing Sheets

INTERFACE FOR EFFICIENT USAGE OF COMMUNICATION CIRCUITRY

BACKGROUND

This disclosure relates to systems and methods for efficient usage of communication circuitry that may implement protocols with variable channel specifications.

Integrated circuit devices are used in numerous electronic systems. Computers, handheld devices, portable phones, televisions, industrial control systems, robotics, and telecommunication networking—to name just a few—all use integrated circuit devices. Integrated circuit devices may be formed using lithography techniques that pattern circuitry onto a substrate wafer that is diced to form a number of (generally identical) individual integrated circuit die. Each integrated circuit die may include many different components, such as programmable logic fabric, digital or analog signal transmission circuitry, digital signal processing circuitry, application-specific data processing circuitry, memory, and so forth. In general, different components may be based on different underlying technologies. Thus, different components of an integrated circuit device may be better suited to different development cycles or fabrication techniques. For example, programmable logic fabric such as field programmable gate array (FPGA) fabric may scale well to smaller sizes and thus may benefit from greatly by newer lithography techniques. On the other hand, other technologies, such as certain analog signal transmission circuitry, may not scale as well and may be better suited for older fabrication techniques.

To enable different components of an integrated circuit device to be developed more independently, some of the components may be moved off-chip. Instead of a single monolithic design, a first integrated circuit die with some of the components may be fabricated separately from a second integrated circuit die with other components. As such, the various separate integrated circuits may be fabricated using different lithography techniques or generations, and may be developed according to different schedules. Yet separating the components onto separate die may come at a cost. Namely, it may be difficult or impossible to use the same number of wires between the separate first integrated circuit die and the second integrated circuit die.

In some cases, the first integrated circuit die may send and transmit communication signals using transceiver circuitry that is located on the second integrated circuit. The transceiver circuitry may include, for example, one or several transmitters and/or receivers physically connected to one or more communication channels. The communication channels that are connected to the transceiver of the second integrated circuit die may be wired or wireless, and may allow the first integrated circuit die to communicate with external data sources via the second integrated circuit die. As noted above, the number of connection wires between the first integrated circuit die and the second integrated circuit die may be limited in comparison to those available in a monolithic design. At the same time, however, certain communication protocols that are often used by transceivers in monolithic designs may involve communication via multiple communication channels. In some cases, the number of communication channels used by the protocols may exceed the number of interconnections available between the first integrated circuit die and the second integrated circuit die.

SUMMARY

Certain aspects commensurate in scope with the originally claimed invention are set forth below. It should be understood that these aspects are presented merely to provide the reader with a brief summary of certain forms of the invention might take and that these aspects are not intended to limit the scope of the invention. Indeed, the invention may encompass a variety of aspects that may not be set forth below.

Methods and systems described herein disclose transceiver circuitries that may be used for communication. The transceiver circuitries may include protocol circuitry that is coupled to an interface of the transceiver circuitry, and a transceiver assigned to the protocol circuitry. The transceiver circuitry may also include a multiplexer that allows the transceiver to be coupled either to the protocol circuitry or to another interface of the transceiver circuitry.

In some embodiments, transceiver circuitry that is coupled to a programmable logic device via an interconnect bridge is described. The transceiver circuitry may have protocol circuitry coupled to the programmable logic device via the interconnect bridge. The transceiver circuitry may also have a set of transceivers assigned to the protocol circuitry and a set of multiplexers that may couple to the interface a subset of transceivers that are not being used by the protocol circuitry.

A method to manage resources of transceiver circuitry having protocol circuitry is also described. The method may include processes for detection of bandwidth of a data link established by the protocol circuitry and determination of the number of transceivers used to establish the data link. The method also includes processes for coupling the interface of the transceiver circuitry to a transceiver that is assigned to but not used by the protocol circuitry.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

Figure 1:
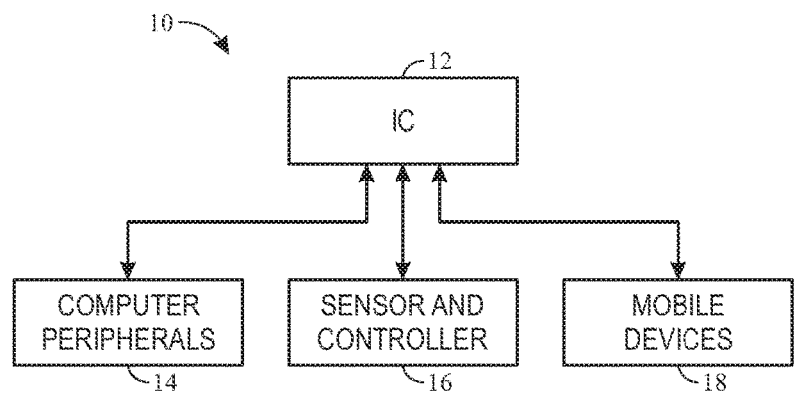
FIG. 1 provides an illustration of systems that may include by an interface for efficient transceiver usage, in accordance with an embodiment.

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In many systems, communication between different electrical devices may be established through communication channels. To that end, dedicated circuitry may be used to implement functions related to physical access to channels, signal and message decoding, protocol implementation, and other related functions that may support data transmission. For example, some electrical devices may include transceivers circuitry coupled to a communication channel to transmit and receive serial signals that encode some data of interest. To access multiple channels, a device may have multiple transceivers that are included in transceiver circuitry. In order to comply with certain protocols for some communication channels, electrical devices may also include protocol circuitry that implements instructions related to the communication channel protocol.

Some protocols may allow simultaneous usage of multiple communication channels to establish a communication link between two electrical devices. For example, the Peripheral Component Interconnect Express (PCIe) protocol may operate according to various specifications that support multiple speeds, which correspond to communication links with larger bandwidths. These higher-bandwidth specifications may be achieved by assigning multiple communication channels to the communication link. For example, an electrical device capable of a PCIe x8 specification may reserve 8 transceivers that are coupled to 8 communication channels and that may be dedicated to serve protocol circuitry that implements the PCIe protocol.

Some use cases may benefit from transceiver and protocol circuitry that allows for reconfigurable changes in the protocol. For example, PCIe circuitry may be capable of satisfying specifications for both x1 and x8 bandwidths. In this example, 8 transceivers of the circuitry may be assigned to service the PCIe circuitry. However, if the PCIe circuitry is configured to operate in an x1 bandwidth, 7 transceivers of the 8 assigned may go unused, leading to an inefficient design. Embodiments herein provide systems and methods for implementation of electrical devices communication protocols with flexible bandwidth requirements with efficient usage of transceiver resources. Implementations may allow a dynamic reassignment of transceivers that may not be used by a particular configuration or mode of the protocol circuitry, as detailed below. Embodiments also detail interfaces that allow for efficient channel and transceiver usage in transceiver circuitries with hard intellectual property (HIP) (i.e., integrated circuits having parts that include hardened logic) blocks responsible for protocol implementations with configurable bandwidth.

With the foregoing in mind, diagram 10 in FIG. 1 illustrates systems that may benefit from the efficient interfaces for transceiver circuitry mentioned above. Interfaces described herein may allow a relatively straightforward method to provide integrated circuits (IC) 12 such as application-specific integrated circuits (ASICs) and/or field-programmable gate arrays (FPGAs) with circuitry responsible for communication and protocol implementations. Such systems may facilitate the production of computer peripherals 14, hardware for sensing and control 16, wireless electrical devices 18, and other systems having electrical devices that can communicate with other electrical devices using a channel.

Figure 2:
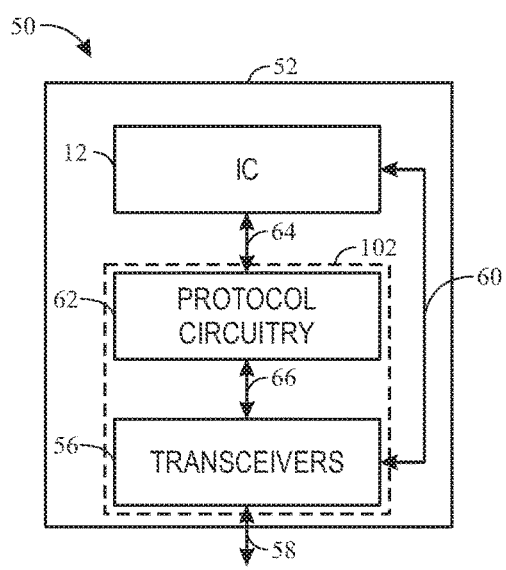
FIG. 2 provides a diagram of an electrical device that may include an interface for efficient transceiver usage, in accordance with an embodiment.

A diagram 50 of FIG. 2 provides an illustration of an example electrical device 52 that may communicate with other electrical devices. In this illustration, an IC 12 may employ transceiver circuitry 56 to access a communication channel 58. In this situation, logic implemented within the IC 54 may provide direct instructions through interface 60 to the transceiver circuitry 56. IC 54 may also access communication channel 58 through protocol circuitry 62 that, via interface 64, provides protocol instructions 66 to the transceiver circuitry 56. In this method of communication, IC 54 may provide a message via interface 64 and the protocol circuitry 62 may generate protocol instructions 66 for the transceiver circuitry 56. System 52 may also receive transmissions from other electrical devices received from communication channel 58. In some situations, the transceiver circuitry 56 may relay direct instructions via interface 60 to the IC 54, whereas in others, transceiver circuitry 56 may send protocol instructions 66 to the protocol circuitry 62, which may be relayed via interface 64 to the IC 54.

In some embodiments, the protocol circuitry 62 and transceiver circuitry 56 may be in a single die (e.g., transceiver circuitry 102) and IC 54 may be coupled to the single die through interfaces 60 and 64. Embodiments described herein allow efficient use of interfaces 60 and 64, as well as of transceivers of transceiver circuitry 56, through reassignment of channels and data paths of interfaces 60 and 64, as detailed below.

Figure 3:
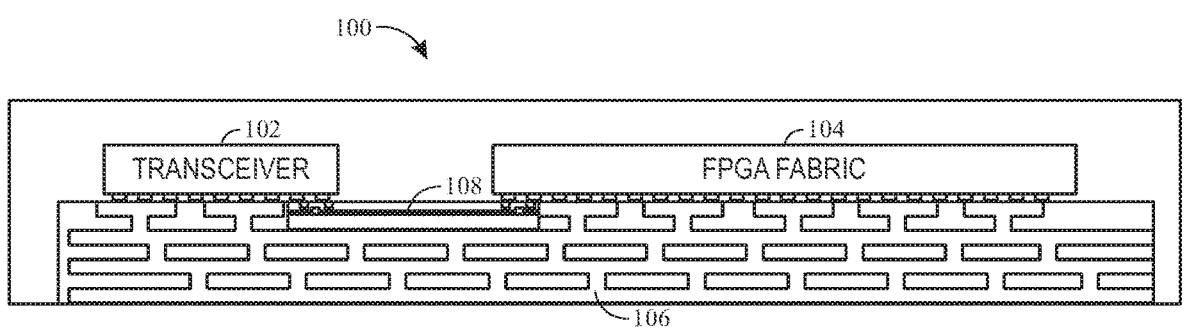
FIG. 3 provides an illustration of an electrical device coupled to transceiver circuitry via an interconnect bridge, in accordance with an embodiment.

FIG. 3 provides an illustration 100 of a connection between transceiver circuitry 102 and an FPGA device 104. Both the transceiver circuitry 102 and FPGA device 104 may be coupled to a substrate 106. The transceiver circuitry 102 may also be coupled to the FPGA device 104 through an interconnect bridge 108, which may provide connection between the devices. The interconnect bridge 108 may be a 2.5D interconnect which provides a high bandwidth connection between the FPGA device 104 and transceiver circuitry 102. While this disclosure generally describes a 2.5D interconnect arrangement, the systems and methods of this disclosure may be suitable for any multi-chip system, which may be represented as a 3D or 2.5D system of separate integrated circuit die that communicate signals between each other in an efficient matter. A 3D interconnection involves stacking integrated circuit die on top of each other, while a 2.5D interconnection involves connecting integrated circuit die through some form of silicon bridge, such as a silicon interposer, a bridge structure disposed in a substrate (e.g., an Embedded Multi-die Interconnect Bridge (EMIB) by Intel Corporation), or a direct connection from stacking one die on top of another. In either a 3D or 2.5D arrangement, the number of connections available between the die may be fewer than may be available if the multiple die were instead part of a single monolithic integrated circuit die.

Figure 4:
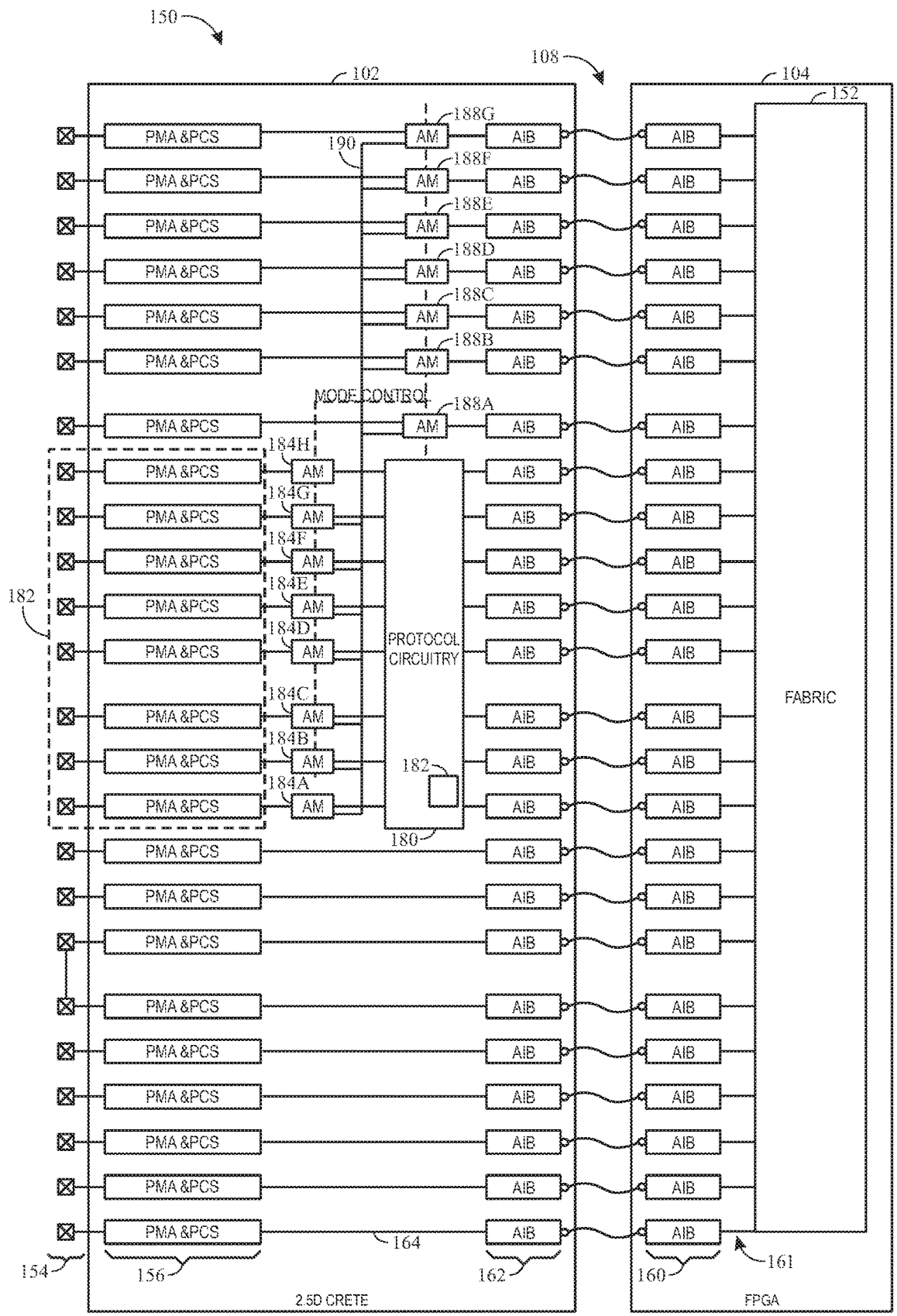
FIG. 4 provides a diagram of an field-programmable gate array (FPGA) device coupled to transceiver circuitry through an interconnect bridge that implements an interface for efficient transceiver usage, in accordance with an embodiment.

FIG. 4 illustrates a block diagram 150 of the connection of the FPGA device 104 to the transceiver circuitry 102 through the interconnect bridge 108. The FPGA device 104 may have an FPGA fabric 152 that can be configured for a variety of circuit configurations. The logic implemented in the FPGA fabric 152 may access channels ports 154 to communicate with other electrical devices. These channel ports 154 may be accessed through instructions provided to a transceiver 156, which may include a physical medium attachment (PMA) and/or a physical coding sublayer (PCS). Other methods to access a channel port 154 may be employed.

An instruction to a transceiver 156 from the FPGA fabric 152 may be provided through the coupling of an FPGA-side interconnect bridge 160 to a transceiver-side interconnect bridge 162. The FPGA fabric 152 may access the FPGA-side interconnect bridge 160 through a connection 163. The FPGA-side interconnect bridge 160 may be coupled to the transceiver-side interconnect bridge 162. The transceiver-side interconnect bridge 162 may be coupled to transceiver 156 through a connection 164.

As mentioned above, the FGPA fabric 152 may employ communication protocols when communicating with other electrical devices. The transceiver circuitry 102 may include protocol circuitry 180 that may receive instructions from the FPGA fabric 152 through the interconnect bridge 108. Protocol circuitry 180 may package messages from the FPGA fabric 152 according to a specific protocol specification implemented by the protocol circuitry 180. Protocol circuitry 180 may implement, for example, PCIe specifications or Ethernet specifications. The protocol circuitry 180 may implement, for example, specifications for PCIe using bandwidths related to 1×, 2×, 4×, 8×, 16×, or 32× speeds. The protocol circuitry 180 may be implemented employing hard intellectual property circuitry (HIP), programmable logic fabric, or any other method to implement circuitry.

To realize communication with other electrical devices using a protocol, transceiver circuitry 102 may have a set of transceivers and channels 182 that are assigned to service the protocol circuitry 180. In some implementations, the number of elements in the set of transceivers and channels 182 may be associated to the bandwidth available to the protocol circuitry 180. For example, transceiver circuitry 102 may have 4, 8, 16, 24, 32, 40, 64, or any number of transceivers 156 associated with channel ports 154. The protocol circuitry 180 may be associated to a set of transceivers and channels 182 having 2, 4, 8, 16, 32 transceivers or any other number of transceivers 156. For example, protocol circuitry 180 of transceiver circuitry with 16 transceivers may have a set of transceivers and channels 182 with 8 transceivers associated with protocol circuitry 180. In such a situation, if protocol circuitry 180 is configured to employ 1 transceiver 156, 7 transceivers 156 of the set of transceivers and channels 182 may be unused. In transceiver circuits with low total number of channels 182, channels 182 assigned to protocol circuitry 180 that are unused may lead to significant inefficiencies.

As discussed above, certain protocol specifications allow flexible bandwidths. In certain systems, protocol circuitry 180 may be configured to satisfy multiple bandwidths that comply with the protocol specification. In applications where the bandwidth may be related to the number of available channels, some elements may of the set of transceivers and channels 182 assigned to the protocol circuitry 180 may be not used for by protocol circuitry 180. The unused elements of the set of transceivers and channels 182 may be reassigned to service another protocol circuitry or the FPGA fabric 152, as detailed below.

As an example, protocol circuitry 180 that implements a PCIe protocol may be configured to establish a communication link using 1×, 2×, 4×, 8× bandwidths and may be assigned to a set of transceivers and channels 182 containing 8 transceivers 156 and 8 channel ports 154. In this example, the protocol circuitry 180 in the 8× configuration may employ all the 8 transceivers 156 and channel ports 154 of the set of transceivers and channels 182. Still referring to this example, the protocol circuitry 180 in the 1× configuration may employ only 1 transceiver 156 and 1 channel port 154 of the set of transceivers and channels 182, and the remaining 7 transceivers 156 and channel ports 154 may be reassigned to service the FPGA fabric, as detailed below. The reassignment of unused elements of the set of transceivers and channels 182 that are assigned to service protocol circuitry 180 may lead to increase in the efficiency of resource utilization.

For reassignment of unused transceivers of the set of transceivers and channels 182, transceiver circuitry 102 may include a set of transceiver-side multiplexers 184A-H and a set of interconnect side multiplexers 188A-G that reroute the signals via a multiplexer bus 190. In the illustrated example, if a specific configuration of the protocol circuitry 180 may be satisfied by only 1 transceiver 156 and 1 channel port 154 of the set of transceivers and channels 182, multiplexers 184A-H may be adjusted such that multiplexer 184H couples transceiver 192H to the protocol circuitry 180 and multiplexers 184A-G couple transceivers 184A-G to multiplexers 188A-G through the multiplexer bus 190. In a different scenario where a specific configuration of the protocol circuitry may employ 4 transceivers 156 and 4 channel ports 156, multiplexers 184E-H may couple transceivers 192E-H to protocol circuitry 180 and multiplexers 184A-D may couple transceivers 192A-D to multiplexers 188A-D or to multiplexers 188E-F. Since multiplexers 188A-G receive a messages directly from the FPGA fabric 152, the transceivers that are coupled to any of the multiplexers 188A-G may service the FPGA fabric directly.

It should be noted that multiplexers 188A-G that are rerouting messages from FPGA fabric 152 to transceivers coupled to any of multiplexers 188A-G may also route messages to the originally assigned transceivers 154. This may be achieved through coding (e.g., time multiplexing) of the signals send from FPGA fabric 152 to multiplexer 188A-G. Since the data rate of interconnect bridge 108 may be higher than the data rate of channels coupled to channel ports 154, the data rate of transmissions sent by transceivers 156 and routed via multiplexers 188A-G may remain the same in either configuration of multiplexers 188A-G.

In order to adjust the control multiplexers 184A-H and 188A-G for the reassignment of transceivers, as described above, protocol circuitry 180 may include a multiplexer controller 194. Multiplexer controller 194 may provide signals to the multiplexers 184A-H and 188A-G to adjust the signal routing to transceivers in order to increase resource efficiency. In some implementations, multiplexer controller 194 may be in different circuitry from the protocol circuitry 180. Control of the multiplexers may be implemented via the multiplexer bus 190 or via a dedicated mode control signal 196. Note that the number and the arrangement of multiplexers and of the multiplexer bus may be adjusted according to the specifications of the protocol implemented by protocol circuitry 180 and the configuration of channel ports 154 and transceivers 156.

Figure 5:
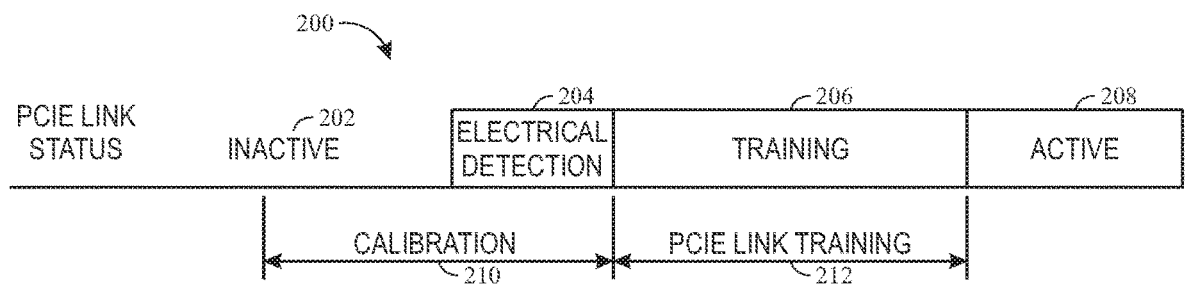
FIG. 5 provides a time-sequence for operation of transceiver circuitry that implements an interface for efficient transceiver usage, in accordance with an embodiment.

As discussed above, channel ports 154 and transceivers 156 may be reassigned to service the FPGA circuitry 104 directly, when they are not being used by protocol circuitry 180. Reassignment may be performed by rerouting signals using multiplexers 184A-H and 188A-G. To perform the reassignment of transceivers to described above, the timing for rerouting may depend on the protocol specification implemented by the protocol circuitry 180. For example, a system that implements a PCIe protocol for communication (e.g., as shown in diagram 10 of FIG. 1, diagram 50 of FIG. 2, or diagram 100 of FIG. 3) may reassign transceivers 156 after identifying the bandwidth used by the data link managed by protocol circuitry 180. The timing diagram 200 of FIG. 5 illustrates a sequence that may be used by PCIe circuitry (such as protocol circuitry 180 of FIG. 4) to establish a data link via transceiver circuitry 102 for efficient transceiver usage, as described above. When establishing a data link using PCIe protocol, protocol circuitry 180 implementing PCIe protocol may initially be at an inactive state 102. The PCIe circuitry may move to an electrical detection mode 204, in which it may determine whether the bandwidth to be used is x1, x4, x8, or x16. During the electrical detection mode 204, link calibration 210 may take place. Following the electrical detection mode 204, PCIe circuitry may begin a training mode 206 during which it may perform link training 212, identify a proper link clock rate, and exchange handshake signals of the PCIe protocol. The PCIe circuitry may move to an active state 208 once the link is established. The reassignment of transceivers 156 via configuration of multiplexers 184A-H and 188A-G described above may be performed following the detection of the bandwidth in electrical detection mode 204. For example, it may be performed during link training 212 or during the active state 208.

Figure 6:
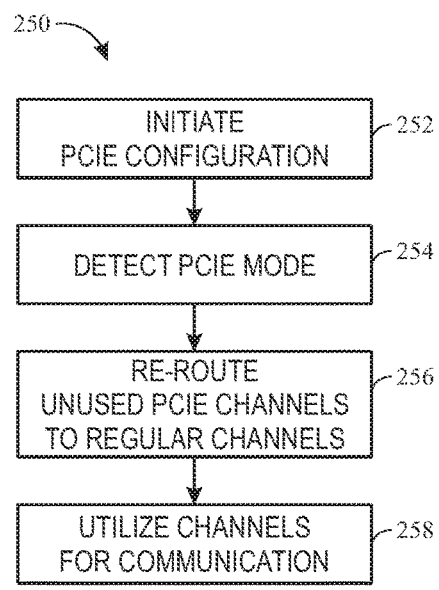
FIG. 6 provides a method for operation of an interface for efficient transceiver usage that implements a communication protocol, in accordance with an embodiment.

The reassignment of unused transceivers and channels are also illustrated in a method 250 of FIG. 6. Method 250 illustrates a process for transceiver circuitry that may have PCIe circuitry serviced by dedicated transceivers and an interface that allows reassignment of transceivers unused by the PCIe circuitry. Method 250 may include an initial PCIe configuration (box 252) which may include receiving a message from a logic device coupled to the transceiver circuitry and configuring the PCIe circuitry to establish a data link. In some processes, the PCIe circuitry may receive a request to establish a data link from an external electrical device, which may be received through the transceiver. During the configuration of the data link, PCIe circuitry may detect the bandwidth or the mode of the PCIe (box 254). In some implementations, the mode may be 1x, 2x, 4x, 8x, or 16x. Other modes specified by a PCIe protocol and implemented by the PCIe circuitry may be selected during the configuration.

The mode selected in the PCIe mode detection (box 254) may determine the number of transceivers to be used for the data link. As described above, the number of transceivers employed in the data link may be smaller than the number of transceivers assigned to service the PCIe circuitry. In these situations, the unused transceivers in the set of transceivers assigned to service the PCIe circuitry may be reassigned to service directly the FPGA fabric (box 256) through rerouting the signals using multiplexers.

In some embodiments, the unused transceivers referred above may also be reassigned to service other protocol circuitries, or to operate with other modules or circuitries that may be located in the transceiver circuitry. The reassignment of unused transceivers may be accomplished by rerouting signals through an adjustment of multiplexers, as described above. The PCIe circuitry may then use the available transceivers to establish the data and the FPGA fabric may use the unused transceivers to establish communication (box 258). Note that the rerouting (box 256) does not increase delays in the communication during operations (box 258), as it only increases the communication path by an addition of a single stage (e.g., mux or buffer). Note further that the above method 250 relates to PCIe circuitry, the method described above may adapted for use by circuitries that implement other protocols.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. Transceiver circuitry comprising:
    a first transceiver coupled to a first communication channel;
    protocol circuitry coupled to a first interface of the transceiver circuitry, wherein the protocol circuitry is configured to implement a communication protocol; and
    a first multiplexer that selectably couples the first transceiver either to:
        the first interface of the transceiver circuitry via the protocol circuitry; or
        a second interface of the transceiver circuitry via a second multiplexer coupled to the first multiplexer and to the second interface of the transceiver circuitry, wherein the second multiplexer couples the first transceiver to the second interface of the transceiver circuitry.

2. The transceiver circuitry of claim 1, comprising a second transceiver selectably coupled to the second interface via the second multiplexer.

3. The transceiver circuitry of claim 2, wherein the second multiplexer receives a coded signal comprising a first instruction for the first transceiver and a second instruction for the second transceiver, and wherein the second multiplexer provides the first instruction to the first multiplexer and the second instruction to the second transceiver.

4. The transceiver circuitry of claim 1, wherein the first multiplexer and the second multiplexer are coupled via a multiplexer bus.

5. The transceiver circuitry of claim 1, comprising a multiplexer controller that controls whether the first multiplexer couples the first transceiver to either the protocol circuitry or the second interface.

6. The transceiver circuitry of claim 5, wherein the multiplexer controller configures the first multiplexer coupling based on a determination that the first transceiver is unused by the protocol circuitry.

7. The transceiver circuitry of claim 1, comprising an interconnect bridge interface that comprises the first interface and the second interface.

8. A system comprising:
    a programmable logic device die;
    an interconnect bridge comprising a plurality of channels and coupled to the programmable logic device die; and
    transceiver circuitry comprising:
        an interconnect bridge interface coupled to the interconnect bridge comprising a first plurality of channel interfaces and a second plurality of channel interfaces;
        protocol circuitry configured to implement a communication protocol and coupled to the first plurality of channel interfaces of the interconnect bridge interface;
        a first set of transceivers;

a second set of transceivers; and
a first set of multiplexers that selectably couples the first set of transceivers to:
the second plurality of channel interfaces via a second set of multiplexers; or
the first plurality of channel interfaces via the protocol circuitry;
wherein the second set of multiplexers selectably couples the second plurality of channel interfaces to the first set of multiplexers or to the second set of transceivers.

9. The system of claim 8, wherein the number of transceivers in the first set of transceivers is the same as to the number of multiplexers in the first set of multiplexers.

10. The system of claim 8, comprising a set of channel ports coupled to the first set of transceivers.

11. The system of claim 8, wherein the second set of multiplexers is coupled to the first set of multiplexers via a multiplexer bus.

12. The system of claim 11, wherein the second set of transceivers is coupled to the second set of multiplexers.

13. The system of claim 8, wherein the interconnect bridge comprises a 2.5D interface.

14. The system of claim 8, comprising a multiplexer controller that couple the subset of transceivers based on a configuration of the protocol circuitry.

15. The system of claim 8, wherein the protocol circuitry comprises Peripheral Component Interconnect Express (PCIe) circuitry that implements a PCIe protocol.

16. The system of claim 8, wherein the protocol circuitry comprises at least in part hardened logic.

17. A method for operation of transceiver circuitry, the method comprising:

detecting a bandwidth of a data link established using protocol circuitry of the transceiver circuitry that implements a communication protocol, wherein the protocol circuitry is directly coupled to a first channel interface of the transceiver circuitry and a first transceiver of the first transceiver circuitry via a first multiplexer;

determining a number of transceivers to be assigned to the protocol circuitry based on the detected bandwidth of the data link;

determine that the first transceiver is unassigned to the protocol circuitry based on the determination of the number of transceivers to be assigned to the protocol circuitry; and coupling a second channel interface of the transceiver circuitry to the first transceiver via a second multiplexer that is directly coupled to the first multiplexer and to the second channel interface.

18. The method of claim 17, wherein coupling the second channel interface of the transceiver circuitry to the first transceiver comprises:

configuring the second multiplexer of the transceiver circuitry coupled to the second channel interface of the transceiver circuitry; and configuring the first multiplexer of the transceiver circuitry coupled to the first transceiver and to the second multiplexer.

19. The method of claim 17, wherein detecting the bandwidth of the data link is performed during an initial configuration of the data link.

* * * * *